United States Patent [19]
Chan

[11] Patent Number: 5,790,906
[45] Date of Patent: Aug. 4, 1998

[54] CAMERA

[75] Inventor: Yet Chan, Kowloon, Hong Kong

[73] Assignee: Foster Assets Corporation, Hong Kong, Hong Kong

[21] Appl. No.: 846,901

[22] Filed: May 1, 1997

[51] Int. Cl.$^6$ .................................................. G03B 41/00
[52] U.S. Cl. ............................ 396/322; 396/340; 396/429
[58] Field of Search ................................ 346/322, 335, 346/340, 310, 315, 316, 429

[56] References Cited

U.S. PATENT DOCUMENTS

| | | | |
|---|---|---|---|
| 5,111,224 | 5/1992 | Spector | 396/322 |
| 5,142,311 | 8/1992 | Olson et al. | 396/322 |
| 5,187,512 | 2/1993 | Kirkendall | 396/322 |

*Primary Examiner*—David M. Gray
*Attorney, Agent, or Firm*—Samuels, Gauthier, Stevens & Reppert

[57] ABSTRACT

A camera having an operating mechanism which comprises a body providing a film take-up chamber for containing an initially empty film cartridge, an exposure chamber having an open rear side, and a film supply chamber for containing a roll of film pre-exposed with border images on respective frames to define respective unexposed areas for subsequent photographic exposure. The operating mechanism includes a shutter mechanism, a film-advancing member for advancing the film frame-by-frame from the film supply chamber to the film take-up chamber across the exposure chamber rear side, and a trigger mechanism for operating the shutter mechanism in response to film advancement by the film-advancing member. A movable cover is used between the exposure chamber rear side and the film, which has a see-through portion to reveal the unexposed area for photographic exposure while protecting the border image of each successive frame. An operating lever is used to engage the cover to the film such that the cover is movable by the film, during film advancement, with the see-through portion maintained in accurate alignment with the unexposed area of each successive frame.

11 Claims, 7 Drawing Sheets

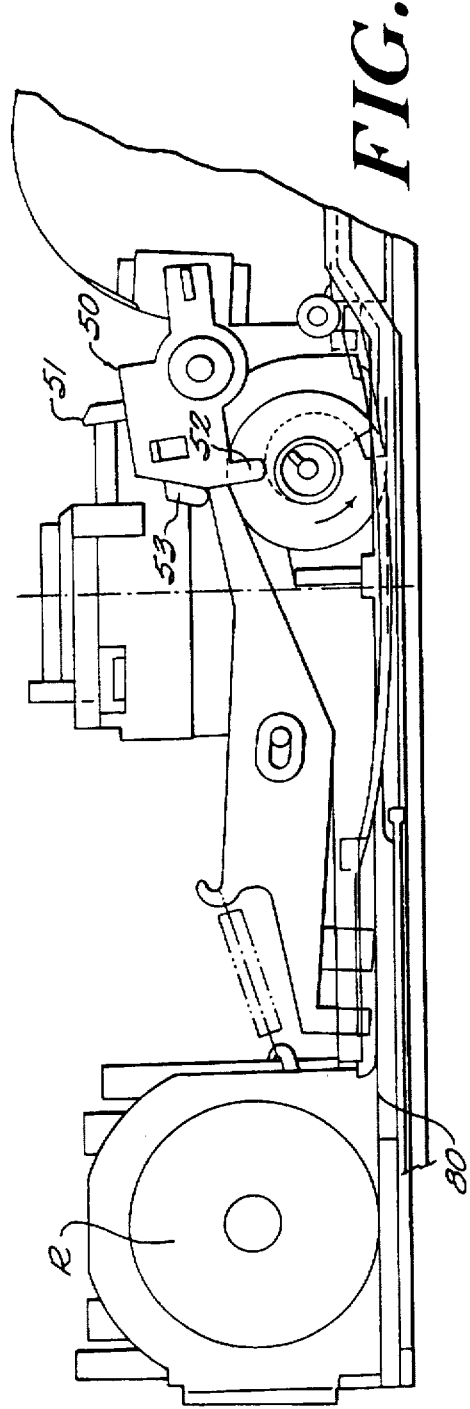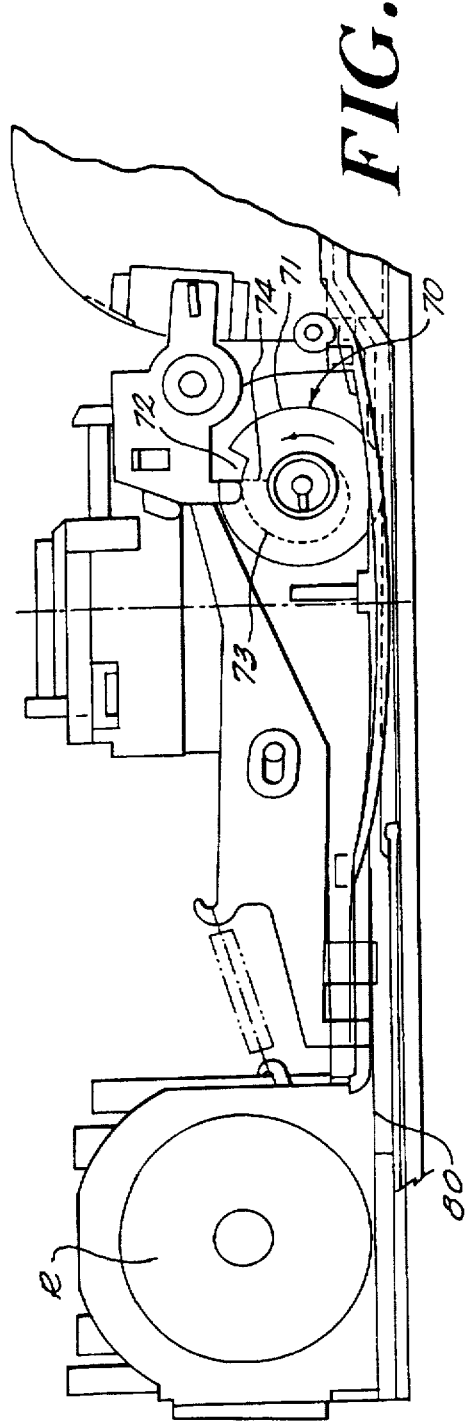

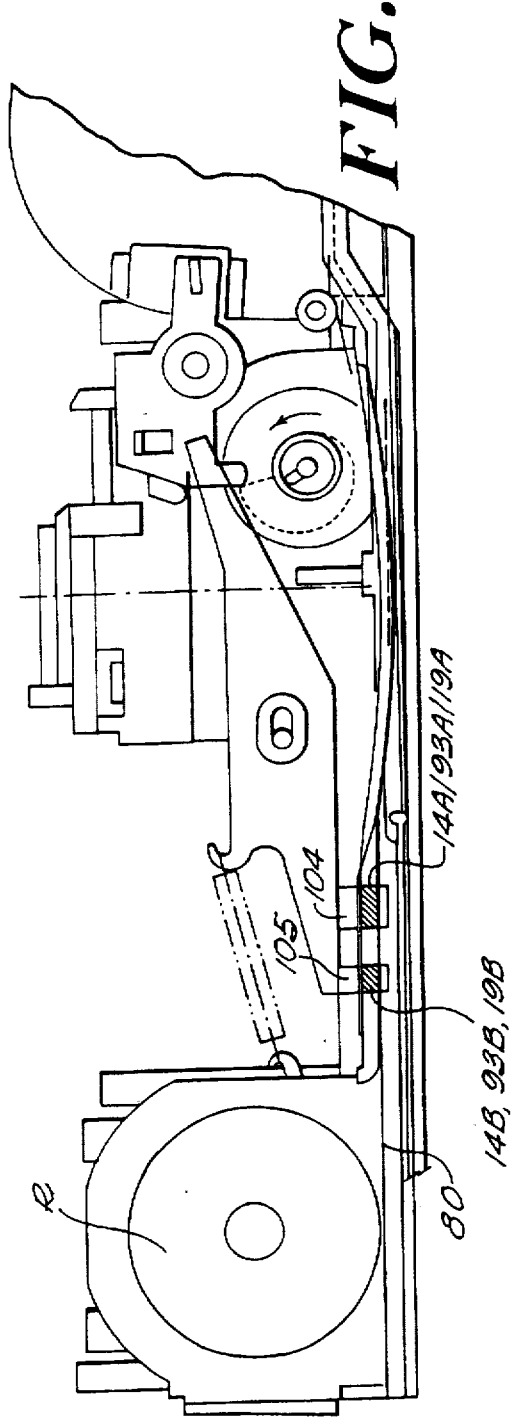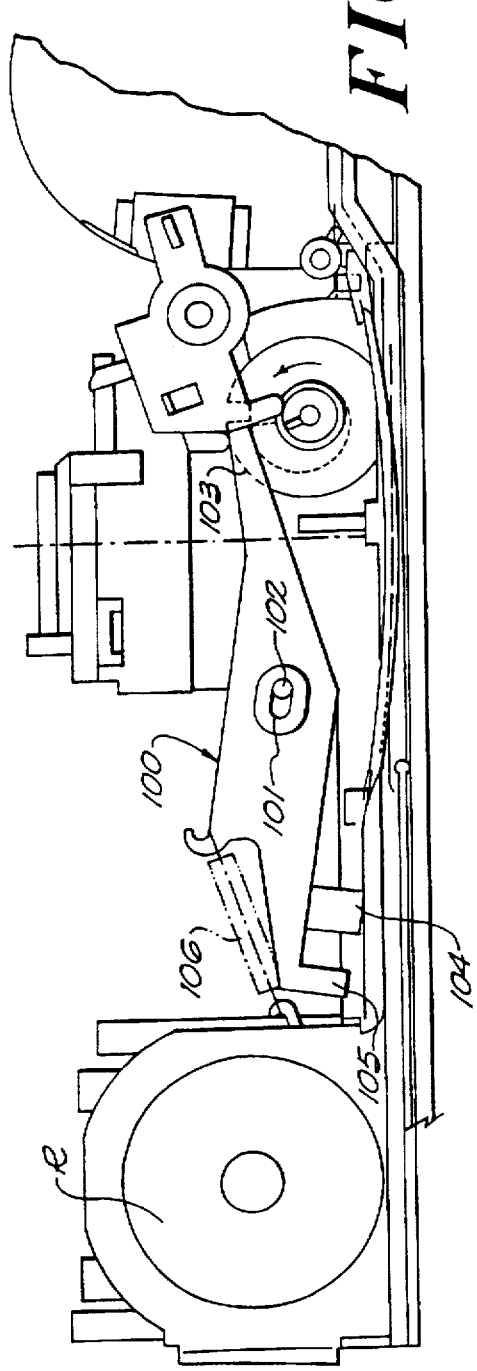

5,790,906

1
CAMERA

SUMMARY OF THE INVENTION

According to the invention, there is provided a camera having an operating mechanism comprising a body which provides a film take-up chamber for containing an initially empty film cartridge, an exposure chamber having an open rear side, and a film supply chamber for containing a roll of film pre-exposed with border images on respective frames to define respective unexposed areas for subsequent photographic exposure, said mechanism including a shutter mechanism to enable photographic exposure, a film-advancing member for advancing the film frame-by-frame from the film supply chamber to the film take-up chamber across the exposure chamber rear side, a trigger mechanism for operating the shutter mechanism in response to film advancement by the film-advancing member, a movable cover for use between the exposure chamber rear side and the film and having a see-through portion to reveal the unexposed area for photographic exposure while protecting the border image of each successive frame, and an engaging member arranged to engage the cover to the film such that the cover is movable by the film, during said film advancement, with the see-through portion maintained in accurate alignment with the unexposed area of each successive frame.

Preferably, the engaging member is arranged to engage the cover to the film only until near the end of the film advancement of each successive frame.

It is preferred that the engaging member is pivotable between a first position engaging the cover to the film and a second position not so engaging.

More preferably, the engaging member is also slidable for simultaneous movement with the film moving the cover.

It is further preferred that the engaging member has a slot in engagement with a separate hinge formation for said pivotable and slidable movement.

In a preferred embodiment, the engaging member has a part and is resiliently biassed by means of a spring to cause the part to engage the cover to the film.

More preferably, the film is formed with an opening at a predetermined position relative to each successive frame for engagement by the part of the engaging member.

Such openings are preferably provided by respective notches.

It is preferred that the engaging member includes a second part for engaging, under the action of the spring, with an appropriate traction hole of the film in addition to the engagement of the first part with each successive opening.

More preferably, said engagement of the second part of the engaging member is enabled by said engagement of the first part.

In a preferred construction, the operating mechanism further includes a fixed plate holding the movable cover close to the exposure chamber rear side, said plate having a see-through portion which is larger than the cover see-through portion.

BRIEF DESCRIPTION OF DRAWINGS

The invention will now be more particularly described, by way of example only, with reference to the accompanying drawings, in which.

2

Figure 1:
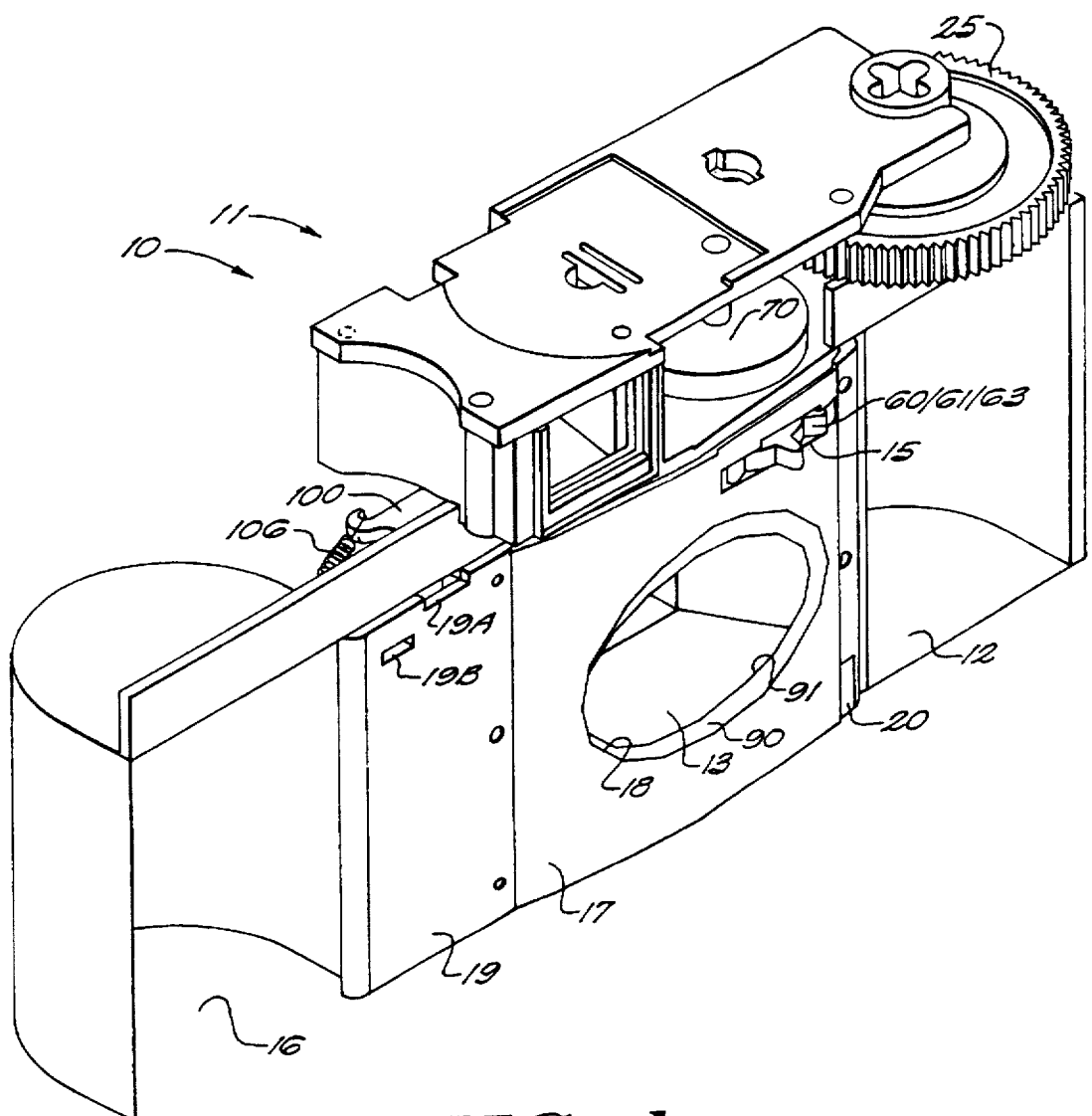
FIG. 1 is a rear perspective view of the operating mechanism of an embodiment of a camera in accordance with the invention.
Figure 2:
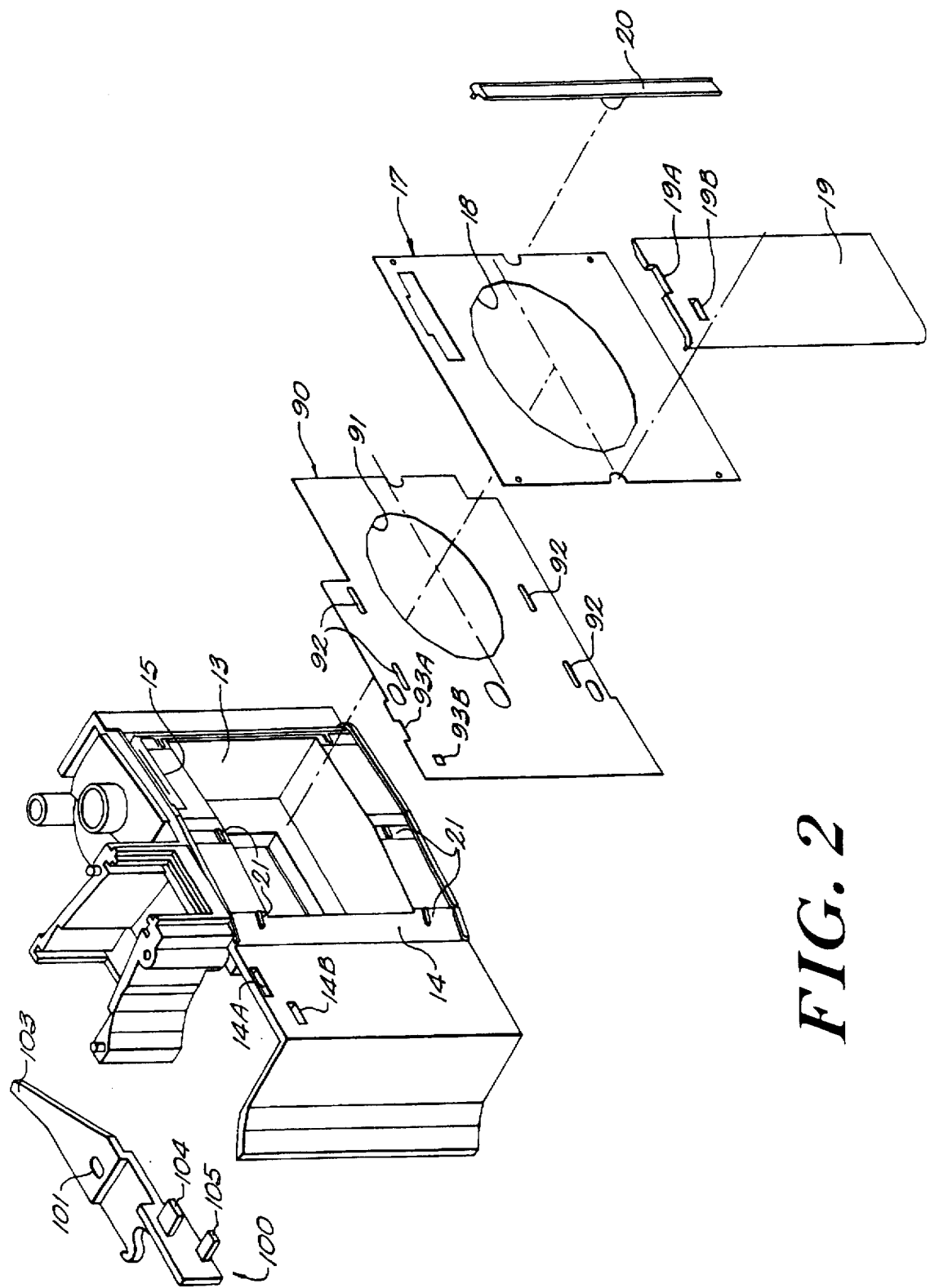
Figure 3:
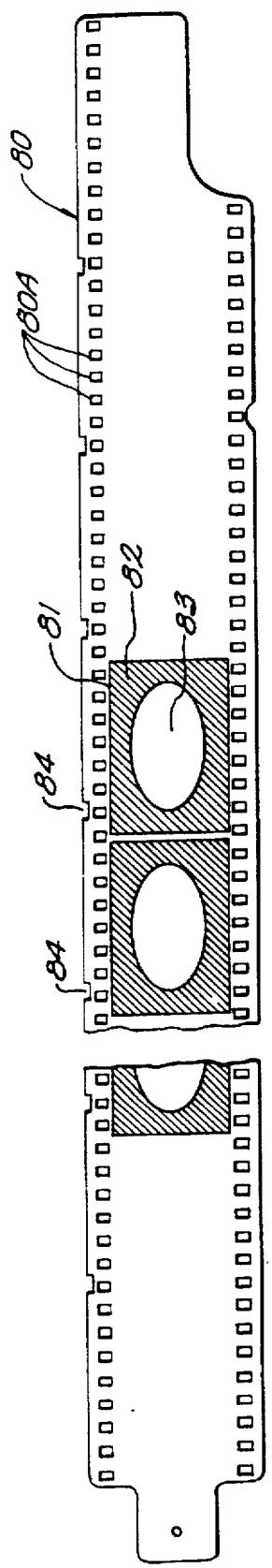
Figure 4A:
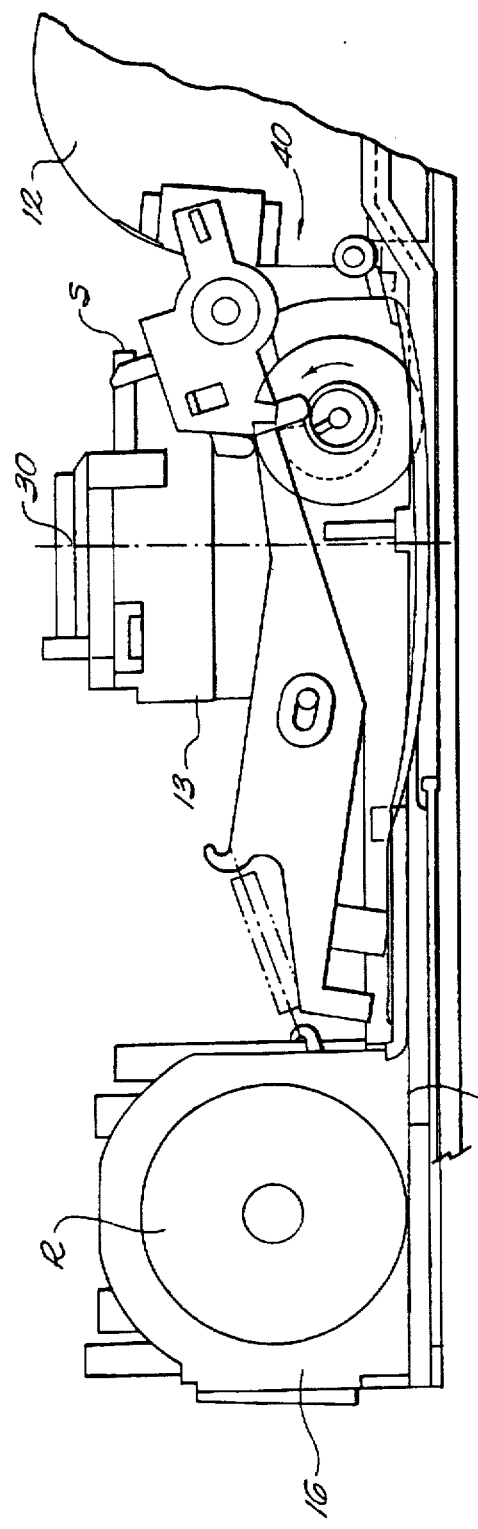
Figure 5A:
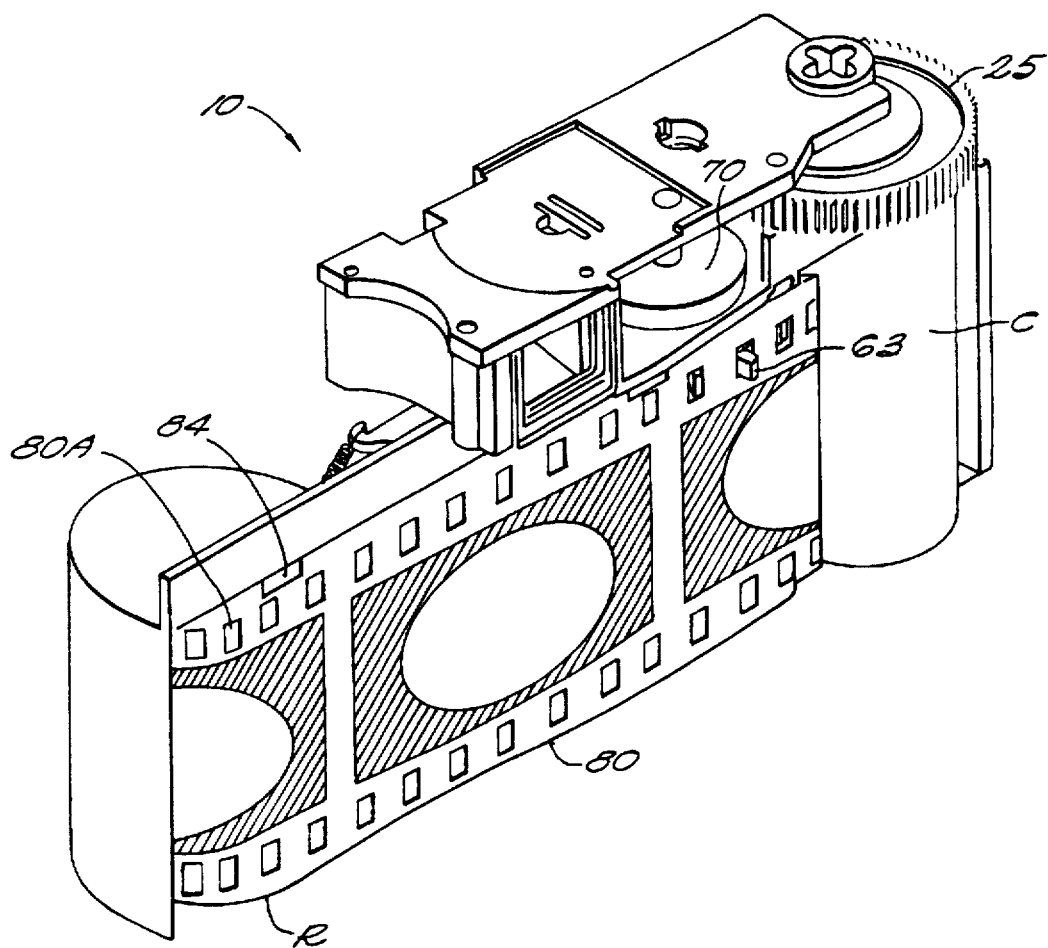
Figure 5B:
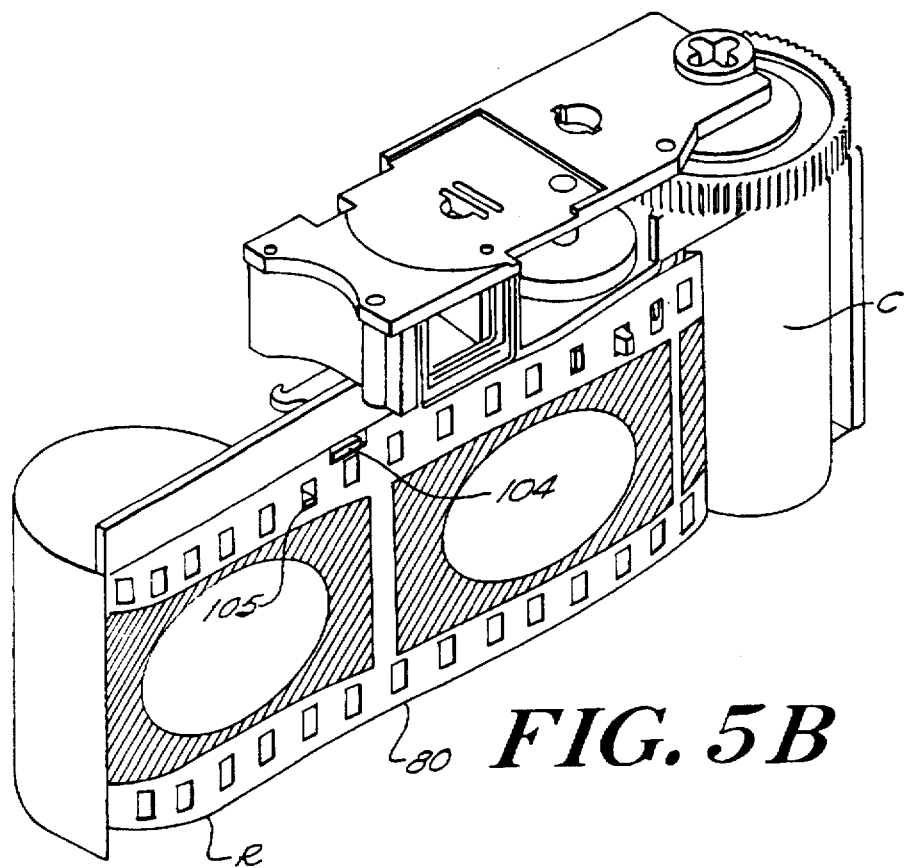
Figure 5C:
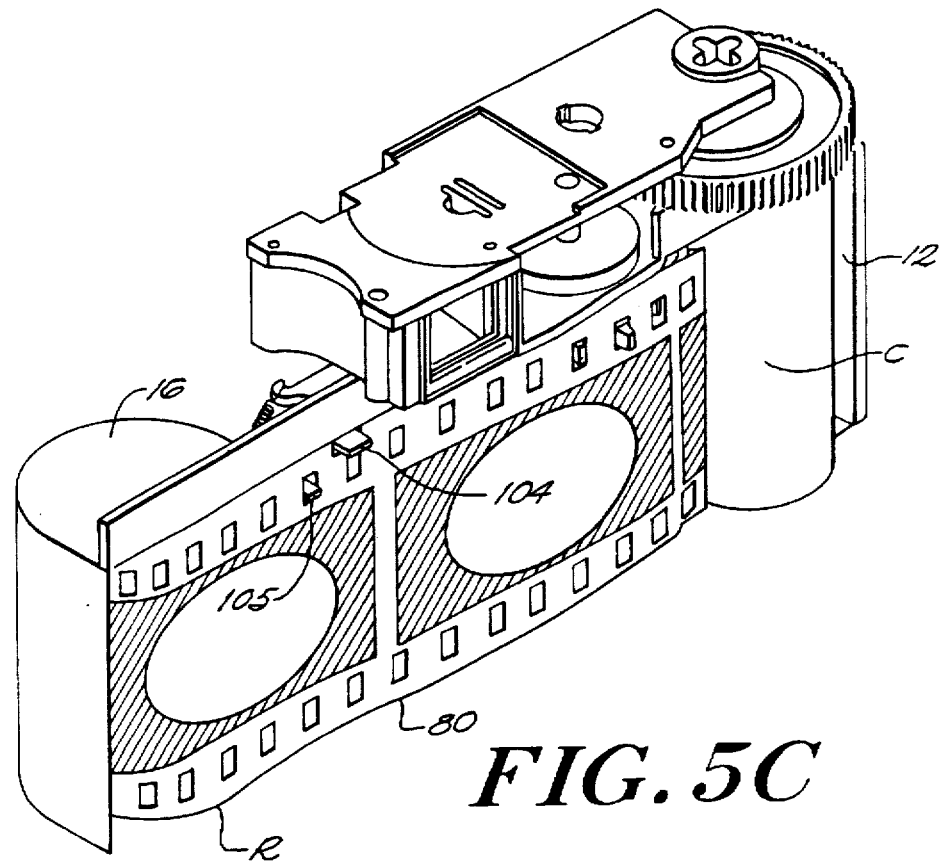

FIG. 2 is an exploded rear perspective view of the operating mechanism of to FIG. 1;

FIG. 3 shows a film strip for use with the operating mechanism of FIG. 1;

FIGS. 4A to 4E are top plan views of the operating mechanism of FIG. 1, showing its sequential conditions operating on the film strip of FIG. 3; and FIGS. 5A to 5C are rear perspective views of the operating mechanism of FIG. 1, showing its sequential conditions operating on the film strip of FIG. 3.

DETAILED DESCRIPTION OF PREFERRED EMBODIMENT

Referring to the drawings, there is shown an operating mechanism 10 of a camera embodying the invention, which mechanism 10 has a body 11 providing a right-side film take-up chamber 12 for containing an initially empty standard 35 mm film cartridge C, a central exposure chamber 13 having a rectangular open rear side 14, and a left-side film supply chamber 16 for containing a 35 mm film roll R wound on a spool. In use, a pre-exposed film strip 80 from the film roll R extends across the rear side 14 of the exposure chamber 13 for photographic exposure. A film-advancing wheel 25 is provided atop the film take-up chamber 12, which is in co-axial engagement with the spool of the film cartridge C, for manual rotation to advance the film strip 80 frame-by-frame from the film roll R into the film cartridge C. The operating mechanism 10 includes a shutter assembly 30 and a trigger mechanism 40, which assembly 30 incorporates a lens (not shown) in front of the exposure chamber 13.

The shutter mechanism 30 contains a spring-loaded shutter plate which has an exposed end S arranged to be stroked by a part (51 see below) of the trigger mechanism 40 for momentarily flicking the shutter plate (shutter release) and thus opening an exposure aperture behind the lens to permit photographic exposure on the film strip 80 through the exposure chamber 13.

The trigger mechanism 40 is formed by a striker 50 which is horizontally pivotable and an assembly of a lower sprocket 60 and an upper cam 70 which are axially inter-engaged for simultaneous horizontal rotation. The striker 50 has first and second side projections 51 and 52 and is spring-loaded to turn (and also to move upwards), thereby urging the first projection 51 to stroke the shutter plate end S and urging the second projection 52 against the cam 70.

The sprocket 60 has an external toothed wheel 61 formed with eight equi-angularly spaced outer teeth 63 and is provided above the right side of the exposure chamber 13 for activating the overall trigger mechanism 40. A horizontal slot 15 is formed through the rear side 14 above the exposure chamber 13 to let at least one tooth 63 of the sprocket wheel 61 protrude out for engaging a respective traction hole 80A of the film strip 80 extending behind the chamber 13. Upon movement by the film-advancing wheel 25, the film strip 80 rotates the sprocket 60 and in turn the cam 70 above in the same direction.

The cam 70 has an upper circular disc portion 71 having a side cutout 72 and a lower radially expanding cam portion 73 having a radial step 74, said the cutout 72 being formed immediately in front of the step 74 below. The cam portion 73 is arranged to be in side contact with the second projection 52 of the striker 50 for, upon rotation by the sprocket 60 and through a cam action, turning the striker 50 in the opposite direction against the action of the spring. The striker 50 will stop turning when its second projection 52 reaches and interlocks from below with the forthcoming cutout 72, under the continual upward action of the same spring. At this time, all the aforesaid rotating and turning actions stop and the film advancement is just completed.

At such time, the film strip 80 has just been advanced for one frame and the trigger mechanism 40 is ready for action to permit photographic exposure on the film strip 80. For this purpose, the user is required to depress a trigger button (not shown) for moving the striker 50 downwards to release the second projection 52 from the cutout 72, whereupon the striker 50 is allowed to turn back quickly under the action of the spring to have its first projection 51 stroking the shutter plate end S as described above.

The construction and operation of the operating mechanism 10 so far described are disclosed in greater detail in earlier U.S. patent application filed on 11 Apr. 1997 under Serial number (pending), the content of which is incorporated herein.

As best shown in FIG. 3, each frame 81 of the film strip 80 is pre-exposed with a border image 82 defining an oval central area 83 which is unexposed for subsequent normal photographic exposure. The rear side 14 of the exposure chamber 13 is provided with a fixed opaque cover 17, which has an oval central aperture 18, for protecting the pre-exposed border image 81 during photographic exposure of each successive frame 81. In prior art construction, such a cover aperture is made to have identical shape and size as the unexposed film area 83, for aligning horizontally with and revealing the exact whole of said film area. It has, however, been found that such alignment cannot always be achieved accurately because mis-positioning of the film relative to the apertured cover is inevitable for low cost cameras and in particular disposable cameras.

This problem is solved by the use of an apertured opaque cover 90 which is movable with the film strip 80 to avoid any mis-alignment therebetween. The movable cover 90 has an oval aperture 91 of identical shape and size as the unexposed film area 83. The fixed cover 17 preferably remains in use, but its aperture 18 is made relatively larger than the movable aperture 91. Mounting plate 19 and strip 20 are used on opposite left and right sides to secure the fixed cover 17 to the exposure chamber rear side 14, forming a thin gap therebetween. The movable cover 90 is held slidably inside the gap for limited horizontal movement in opposite directions. The vertical position of the cover 90 is maintained by means of four horizontal slots 92 slidably engaging with respective shorter horizontal ribs 21 on the exposure chamber rear side 14.

The left side of the movable cover 90 is formed with a flat top notch 93A and a short horizontal slot 93B, said slot 93B being formed on the left side of and below the notch 93A and at the same level as the slot 15 exposing the sprocket teeth 63. The exposure chamber rear side 14 is formed with relatively longer horizontal slots 14A and 14B at positions corresponding to that of the respective notch 93A and slot 93B. The mounting plate 19 is also formed with relatively longer flat top notch 19A and horizontal slot 19B at the same corresponding positions. For cooperation, the film strip 80 is formed with a series of flat top notches 84 at predetermined positions relative to the respective frames 81.

The operation of the movable cover 90 is controlled by means of a flat operating lever 100 extending above the exposure chamber 13. The lever 100 has a longitudinally extending short slot 101 at mid-length in engagement with a fixed hinge pin 102 upstanding from the left side of the exposure chamber 13, for limited horizontal sliding/pivotal movement about the hinge pin 102 between an inoperative position (FIGS. 4A and 4E) and an operative position (FIG. 4D). Right end 103 of the lever 100 is engaged with a third projection 53 of the striker 50. The lever's left end has, on the back side, first and second flat fingers 104 and 105 which are in alignment with and for extending out through respective slot/notches 14A/93A/19A and slots 14B/93B/19B (FIG. 4D).

The lever 100 is resiliently biassed to pivot towards its operative position by means of a spring 106, as shown, such that the right end 103 bears against the third projection 53 of the striker 50 and that the fingers 104 and 105 have a tendency to extend out through the respective slots and notches (FIG. 4D). Such pivotal movement is restrained by the engagement between the lever's right end 103 and the striker's third projection 53 (FIGS. 4A and 4E). Upon the aforesaid turning of the striker 50 in the initial direction, its third projection 53 will gradually release the lever's right end 103, whereby the lever 100 will pivot gradually to the operative position under the action of the spring 106 (from FIGS. 4A to 4D).

In operation, the film strip 80 is stretched across and behind the fixed cover 17. During film advancement, the striker 50 is simultaneously turned by the film strip 80 through the engagement of the sprocket teeth 63 with the film traction holes 80A. As described above, the lever 100 is allowed to gradually pivot to the operative position under the action of the spring 106, with the fingers 104 and 105 biassed to extend out through the respective slot/notches 14A/93A/19A and slots 14B/93B/19B. However, before the fingers 104 and 105 can extend fully out, the first finger 104 is blocked by the top edge of the film strip 80 (FIGS. 4B and 5A) until near the end of film advancement when a forthcoming film top notch 84 comes into alignment with and thus releases the first finger 104 (FIGS. 4C and 5B). At the same moment, an appropriate traction hole 80A also comes into alignment with the second finger 105. Accordingly, both fingers 104 and 105 can now extend fully out to also engage with the film strip 80 on the back, thereby engaging the movable cover 90 to the film strip 80.

Such engagement results in accurate horizontal alignment of the cover aperture 91 with the unexposed area 83 of the forthcoming frame 81. Afterwards, the film strip 80 continues to advance slight further, while carrying with it the movable cover 90 maintained in said alignment, until the film advancing action is finally completed (FIGS. 4D and 5C). During such further movement, the lever 100 is simultaneously moved lengthwise to the right by the film strip 80, which is made possible by reason of the length of the slot 101 relative to the hinge pin 102.

Upon depression of the aforesaid trigger button to take a photograph, the striker 50 turns back quickly, as described above, to have its third projection 53 re-engaging the lever's right end 103, thereby pivoting the overall lever 100 back to the inoperative position (FIG. 4E) against the spring 106 to have the fingers 104 and 105 withdrawn from engagement with the film strip 80. Under the action of the spring 106, the lever 100 is also moved lengthwise back to the left and be ready for the next operating cycle.

As the top notches 84 and 93A of the film strip 80 and movable cover 90 are open-sided and may therefore not be sufficiently strong to be held by the first finger 104 of the lever 100, the second finger 105 is additionally used, as a preferred option, to achieve firm and sound engagement with the film strip 80 and cover 90. Accordingly, the second finger 105 may be dispensed with, for example if the top notches 84 and 93A are made closed.

It is envisaged that, as the fixed cover 17 is merely used to hold the movable cover 90 in sliding position, the fixed aperture 18 may be made in any other shapes provided that it is larger than the movable aperture 91. Also, as the use of the cover 90 movable by the film 80 during film advancement ensures the alignment of the aperture 91 with an unexposed film area 83 only in the travelling direction of the film 80, the invention is also applicable to pre-exposed border images which do not surround the respective frames 81 completely.

The purpose of the aperture 91 of the cover 90 is to reveal each successive unexposed area 83 of the film 80 for, upon correct alignment of the aperture 91 with said area 83, photographic exposure at the right place on the film 80. Insofar as this purpose is concerned, the cover 90 does not need to have an aperture 91, as such, provided that it has a see-through portion for revealing the unexposed areas 83. For example, the cover 90 may be provided by a transparent sheet which is made opaque except at a central portion to form a see-through window for acting as the aperture 91. The window may be printed with material for forming an image on the film area 83 during photographic exposure.

The invention has been given by way of example only, and various other modifications of and/or alterations to the described embodiment may be made by persons skilled in the art without departing from the scope of the invention as specified in the appended claims.

What is claimed is:

1. A camera having an operating mechanism comprising a body which provides a film take-up chamber for containing an initially empty film cartridge, an exposure chamber having an open rear side, and a film supply chamber for containing a roll of film pre-exposed with border images on respective frames to define respective unexposed areas for subsequent photographic exposure, said mechanism including a shutter mechanism to enable photographic exposure, a film-advancing member for advancing the film frame-by-frame from the film supply chamber to the film take-up chamber across the exposure chamber rear side, a trigger mechanism for operating the shutter mechanism in response to film advancement by the film-advancing member, a movable cover for use between the exposure chamber rear side and the film and having a see-through portion to reveal the unexposed area for photographic exposure while protecting the border image of each successive frame, and an engaging member arranged to engage the cover to the film such that the cover is movable by the film, during said film advancement, with the see-through portion maintained in accurate alignment with the unexposed area of each successive frame.

2. A camera as claimed in claim 1, wherein the engaging member is arranged to engage the cover to the film only until near the end of the film advancement of each successive frame.

3. A camera as claimed in claim 1, wherein the engaging member is pivotable between a first position engaging the cover to the film and a second position not so engaging.

4. A camera as claimed in claim 3, wherein the engaging member is also slidable for simultaneous movement with the film moving the cover.

5. A camera as claimed in claim 4, wherein the engaging member has a slot in engagement with a separate hinge formation for said pivotable and slidable movement.

6. A camera as claimed in claim 1, wherein the engaging member has a part and is resiliently biassed by means of a spring to cause the part to engage the cover to the film.

7. A camera as claimed in claim 6, wherein the film is formed with an opening at a predetermined position relative to each successive frame for engagement by the part of the engaging member.

8. A camera as claimed in claim 7, wherein the openings are provided by respective notches.

9. A camera as claimed in claim 7, wherein the engaging member includes a second part for engaging, under the action of the spring, with an appropriate traction hole of the film in addition to the engagement of the first part with each successive opening.

10. A camera as claimed in claim 9, wherein said engagement of the second part of the engaging member is enabled by said engagement of the first part.

11. A camera as claimed in claim 1, wherein the operating mechanism further includes a fixed plate holding the movable cover close to the exposure chamber rear side, said plate having a see-through portion which is larger than the cover see-through portion.

* * * * *